(12) United States Patent
Lorenz

(10) Patent No.: US 12,352,320 B2
(45) Date of Patent: Jul. 8, 2025

(54) TORQUE DISTRIBUTION DEVICE FOR A MOTOR VEHICLE HAVING TWO DUAL PISTON HYDRAULIC CLUTCHES, AND METHOD FOR OPERATING THE TORQUE DISTRIBUTION DEVICE

(71) Applicant: Schaeffler Technologies AG & Co. KG, Herzogenaurach (DE)

(72) Inventor: Elmar Lorenz, Rheinmünster Söllingen (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 18/695,598

(22) PCT Filed: Sep. 14, 2022

(86) PCT No.: PCT/DE2022/100679
§ 371 (c)(1),
(2) Date: Mar. 26, 2024

(87) PCT Pub. No.: WO2023/057004
PCT Pub. Date: Apr. 13, 2023

(65) Prior Publication Data
US 2024/0392843 A1 Nov. 28, 2024

(30) Foreign Application Priority Data

Oct. 8, 2021 (DE) ...................... 10 2021 126 109.0

(51) Int. Cl.
*F16D 25/0638* (2006.01)
*F16D 25/10* (2006.01)
*F16D 21/06* (2006.01)

(52) U.S. Cl.
CPC ......... *F16D 25/0638* (2013.01); *F16D 25/10* (2013.01); *F16D 2021/0607* (2013.01)

(58) Field of Classification Search
CPC ................. F16D 25/0638; F16D 25/10; F16D 2021/0607; F16D 13/52; F16D 2013/706
See application file for complete search history.

(56) References Cited

U.S. PATENT DOCUMENTS 6,382,382 B1 * 5/2002 Avny .................. F16D 25/0638
192/85.33
10,563,707 B2 2/2020 Park
(Continued)

FOREIGN PATENT DOCUMENTS

DE 4041159 A1 7/1992
DE 10131816 A1 1/2003
(Continued)

*Primary Examiner* — Farhana Pervin

(57) ABSTRACT

A torque distribution device includes a rotor support, an internal disc carrier, a clutch device including a disc pack and an actuation device for actuating the clutch device. The actuation device includes a stationary holding element, a spring element, and primary and secondary pistons axially displaceably mounted on the holding element. The primary piston delimits a primary pressure chamber and is arranged to be moved in a first axial direction against the disc pack the primary pressure chamber is pressurized. The secondary piston delimits a secondary pressure chamber and is movable counter to a restoring force of the spring element in a direction opposite the first axial direction the secondary pressure chamber is pressurized. The spring element is coupled to the primary piston to move the primary piston in the direction opposite the first axial direction when the secondary pressure chamber is depressurized.

16 Claims, 3 Drawing Sheets

(56) References Cited

U.S. PATENT DOCUMENTS

| | | | |
|---|---|---|---|
| 2004/0182668 A1* | 9/2004 | Biermann | F16H 63/3026 |
| | | | 192/3.51 |
| 2006/0144665 A1* | 7/2006 | Janson | F16D 25/10 |
| | | | 192/48.8 |
| 2019/0186559 A1* | 6/2019 | Shin | F16D 25/0638 |
| 2019/0351753 A1* | 11/2019 | Lehmann | F16D 25/10 |
| 2020/0116210 A1 | 4/2020 | Chae et al. | |
| 2021/0379982 A1* | 12/2021 | Omote | B60K 6/48 |

FOREIGN PATENT DOCUMENTS

| | | |
|---|---|---|
| DE | 102018130326 A1 | 3/2020 |
| EP | 3502504 A1 | 6/2019 |

* cited by examiner

TORQUE DISTRIBUTION DEVICE FOR A MOTOR VEHICLE HAVING TWO DUAL PISTON HYDRAULIC CLUTCHES, AND METHOD FOR OPERATING THE TORQUE DISTRIBUTION DEVICE

CROSS-REFERENCE TO RELATED APPLICATIONS

This application is the United States National Phase of PCT Appln. No. PCT/DE2022/100679 filed Sep. 14, 2022, which claims priority to German Application No. DE102021126109.0 filed Oct. 8, 2021, the entire disclosures of which are incorporated by reference herein.

TECHNICAL FIELD

The present disclosure relates to a torque distribution device comprising a rotor support, which is or can be coupled to a shaft that introduces the torque, and two separate clutch devices, which are each in the form of a multi-disc clutch and which can each be actuated separately via an actuation device.

BACKGROUND

Such a torque distribution device is used in motor vehicles and serves to selectively distribute a torque introduced on a component of the torque distribution device to two separate output shafts. Such a torque distribution device is also often called a "torque vectoring module." Its function is based on the fact that the rotor support, which forms a type of housing, is coupled to the input shaft, which can also be referred to as the drive or input shaft, so that a torque can be introduced into the torque distribution device.

The torque distribution device includes two separately operable clutch devices, which are designed as multi-disc clutches. Each clutch device is connected to the rotor support, on the one hand and, on the other hand, is coupled to separate output shafts via separate internal disc carriers. Via the two selectively operable clutch devices, the introduced torque can be selectively supplied to one, the other or both output shafts, in particular in a variable ratio. The basic structure and function of such a torque distribution device is known, for example, from U.S. Pat. No. 10,563,707 B2.

From the patent U.S. Pat. No. 10,563,707 B2 a system including a first and a second pressure piston is also known, in which the second pressure piston runs against the disc pack and the first pressure piston runs against the second pressure piston. Such a system is also referred to as a "tandem arrangement". Here, the two individual forces of the pressure pistons are added together, and the pressure chambers assigned to the pressure pistons being controlled in particular synchronously or acted upon by the pressure medium.

The external disc pack and the internal disc pack, which mesh with one another, can be actively compressed using the associated actuation device and can also be correspondingly relieved again. The discs can be brought into a frictional connection, in particular a frictional fit, by means of the actuating device in order to transmit the torque, wherein this state is also referred to as the sensed state. To compress the disc packs, the actuation device comprises a primary piston, to which a primary pressure chamber is assigned. A hydraulic pressure medium can be pressed into the primary pressure chamber so that an axial displacement of the primary piston, which causes the disc packs to be compressed, is controlled. The respective clutches are opened or, in other words, released by relieving the pressure, so that the frictional connection or frictional fit is eliminated.

SUMMARY

The present disclosure specifies an improved design for a torque distribution device.

The torque distribution device of the type mentioned is provided, according to the disclosure, such that the secondary piston delimits a secondary pressure chamber. The secondary piston acting against the restoring force when the pressure medium or a pressure medium located in the secondary chamber is pressurized in a direction opposite to the pressure-related actuating movement of the primary piston a spring element is movable, and the spring element is coupled to the primary piston in such a way that it moves the primary piston against the external disc pack when the pressure in the secondary pressure chamber is reduced.

When the clutch device is transferred from the release position to the sensing position, pressure relief of the pressure medium in the secondary pressure chamber causes the initially preloaded spring element to be pressed without delay against the primary piston, which is thus moved, also without delay, against the disc pack by means of the spring element. A so-called release clearance, i.e., any distance between the disc pack and the primary piston, can therefore be bridged immediately and without any time delay by means of the preloaded spring element when the clutch device is to be transferred from the release position to the sensing position. This bridging would take place without the preloaded spring element by pressurizing the primary pressure chamber, with the resulting bridging of the release clearance taking more time than is the case with the present disclosure using the spring element. The present disclosure therefore enables a low-hysteresis control behavior of the clutch device when transferring from the release position to the sensing position.

As long as the clutch device is in the release position, the pressure in the secondary pressure chamber must be kept high enough so that the spring element is pushed away from the primary piston against its restoring force by means of the secondary piston. As already mentioned, starting from this state, a pressure relief in the secondary pressure chamber almost suddenly leads to a pressing of the spring element against the primary piston and thus of the primary piston against the disc pack, so that the release clearance is immediately bridged. Then, in order to build up the final pressure force of the primary piston against the disc pack, the primary pressure chamber is pressurized. The final pressure force of the primary piston on the disc pack then results from the pressure force caused by the pressure present within the primary pressure chamber.

The spring element may be a plate spring or a bellows. This can be attached to the rotor support or housing of the torque distribution device. It is also conceivable that the spring element includes multiple coil springs arranged along a circumferential direction of the torque distribution device. In all of these embodiments, the spring element exerts a uniform pressure force on the corresponding components with respect to the circumferential direction.

Although it is conceivable that the pistons are in direct contact with the spring element, a transmission component may be provided which is arranged axially displaceably on the holding element and which couples the spring element to the primary piston and to the secondary piston. The transmission component represents a central component with regard to the intended force transmissions, which is coupled to the components involved, in particular via touch contact. The transmission component can be designed like a piston and, for example, can extend over other components of the torque distribution device in a cup-like manner to save installation space. A front portion of the transmission component can be in contact with the spring element and the secondary piston, and an open portion of the transmission component opposite the front portion is supported on the primary piston.

The transmission element may have a further spring element, via which the spring element is coupled to the primary cylinder. The spring element and the remaining portion of the transmission element can be formed in one piece. The force of the spring element on the primary piston is thus transmitted via the further spring element. This ensures that the spring element is not rigidly coupled to the primary piston, but rather that there is play with respect to the distance between the primary piston and the spring element by means of the further spring element. For example, when the pressure medium arranged in the primary pressure chamber is pressurized, the primary piston moves against the restoring force of the further spring element, so that the primary piston is moved away from the spring element against the disc pack. In the sensing position of the clutch device, the transmission element can rest in a stop position on a support flange, which will be discussed in detail later, so that a corresponding elastic expansion of the further spring element can take place by pressurizing the primary pressure chamber. This restoring force causes the spring force of the further spring element to immediately cause the primary piston to move away from the disc pack and thus empty the primary pressure chamber in the event of a pressure relief in the primary pressure chamber, i.e., when the sensing position is lifted. In other words, in this embodiment of the disclosure, a delay-free opening of the frictional connection of the disc packs and thus a hysteresis-free control behavior of the torque distribution device is effected when transferring from the sensing to the release position.

The further spring element is or may include a bellows. A bellows is an elastic element that can be folded up like an accordion and can extend radially completely around the circumference with respect to an axis of rotation of the torque distribution device such that the most uniform possible force effect is achieved by means of the bellows. In relation to the axial direction, the bellows may have a repeating cross-sectional structure, which at least in sections can be U-shaped and/or Q-shaped. The restoring force or the spring hardness of the spring element that can be brought about by means of the bellows depends, for example, on the wall thickness of the bellows material. The bellows may be made of a metal that is beneficial in terms of mechanical properties, such as elasticity and longevity.

The bellows may delimit the primary pressure chamber outwards with respect to the radial direction. In this embodiment, the bellows itself is fluid-tight and attached to the primary piston via a fluid-tight connection. The bellows not only effects the described function with regard to the restoring force, but also serves to seal or limit the primary pressure chamber.

In an example embodiment, the holding element has a support flange which extends between the primary piston and the secondary piston and delimits the primary pressure chamber and/or the secondary pressure chamber. In this embodiment, the holding element serves in a synergistic manner not only for the axial guidance of the primary piston, the secondary piston and, for example, the transmission component, but also forms a boundary wall of at least one of the pressure chambers. For example, if the primary pressure chamber is delimited by means of the support flange, the transmission component can engage over the holding element in a cup-like manner, and the primary pressure chamber is additionally delimited by the transmission component and, for example, the further elastic element. Here, the support flange for sealing the primary pressure chamber can have a fluid-tight sealing element at its radial outer end, such as a sealing ring, along which the transmission component can be displaced.

The support flange may have, with respect to the radial direction, a, for example, disc-like, inner portion and an axially offset, for example, disc-like, outer portion. The inner portion and the outer portion are connected to one another via a for example, cylindrical, middle portion of the support flange, and the secondary pressure chamber is delimited by the inner portion and the middle portion. The axially displaceable secondary piston can have a sealing ring on the radial outside for sealing the secondary pressure chamber. This embodiment also enables a space-saving design of the torque distribution device.

To distribute the pressure medium into the pressure chambers, a pressure medium distribution unit connected to a pressure medium supply line, which is part of the holding element and/or is arranged thereon, can be provided. A pressure medium supply line can also be provided for each of the pressure chambers. The pressure medium supply line can run at least in portions within the holding element and be fluidly coupled to the respective associated pressure chamber, e.g., via a branch in each case. The pressure medium distribution unit can have at least one valve that can be controlled by a control device, such that the pressurization and pressure reduction in the pressure chambers can be controlled accordingly.

The present disclosure further relates to a method for operating a torque distribution device according to the preceding description, wherein the multi-disc clutch is thereby moved from a release position in which the plate packs are not in frictional contact to a sensing position in which the plate packs are in frictional contact, e.g., in frictional engagement, be transferred that before the pressurization of the pressure medium arranged in the primary pressure chamber, a pressure relief of the pressure medium arranged in the secondary pressure chamber and pressurized takes place. All aspects, features and advantages of the method according to the disclosure can be applied to the pressure torque distribution device according to the disclosure and vice versa.

Starting from the release position, it is thus provided that the pressure medium in the primary pressure chamber is not pressurized, and the pressure medium in the secondary pressure chamber is pressurized, such that the elastic element does not exert any pressure force on the primary piston. If there is a control signal that indicates a transfer of the torque distribution device or the clutch device into the sensing position, the pressurization in the secondary pressure chamber can be eliminated, for example by opening a corresponding valve. This causes the spring element to immediately relax and press against the primary piston, such that the release clearance is quickly bridged. The pressure medium arranged in the primary pressure chamber is then pressurized so that the pressure force of the primary piston is generated on the disc pack.

Additionally or alternatively, it can be provided in the method according to the disclosure that the multi-disc clutch is transferred from the sensing position to the release position by releasing the pressure of the pressure medium arranged in the primary pressure chamber and pressurized and pressurizing the pressure medium arranged in the secondary pressure chamber.

This results in an almost hysteresis-free control of the torque distribution device to transfer it from the sensing position to the release position. The loss of pressure in the primary pressure chamber immediately results in a reduction in the pressure force of the primary piston on the disc pack, and, if the further spring element is provided, this causes the primary pressure chamber to immediately empty with respect to the pressure medium so that the primary piston can be released from the disc pack without delay moved away and therefore the frictional connection or the friction between the disc packs is eliminated. In addition, the pressurization of the pressure medium in the secondary pressure chamber causes the spring element to move away from the primary piston against its restoring force and thus the pressure force of the spring element on the primary piston is canceled.

The pressure relief of the pressure medium arranged in the secondary pressure chamber and pressurized when the multi-disc clutch is transferred from the release position to the sensing position can take place by switching a valve device, e.g., the pressure medium distribution unit, in such a way that the primary pressure chamber and the secondary pressure chamber are fluidly connected to one another. This fluidic connection causes a transfer of the pressure medium or the pressure from the secondary pressure chamber into the primary pressure chamber. As already explained above, in this process the primary pressure chamber is pressurized with the pressure present in the secondary pressure chamber, whereby the pressurization of the primary pressure chamber is accelerated.

BRIEF DESCRIPTION OF THE DRAWINGS

The disclosure is explained below on the basis of exemplary embodiments with reference to the drawings. In the schematic drawings.

DETAILED DESCRIPTION

Figure 1:
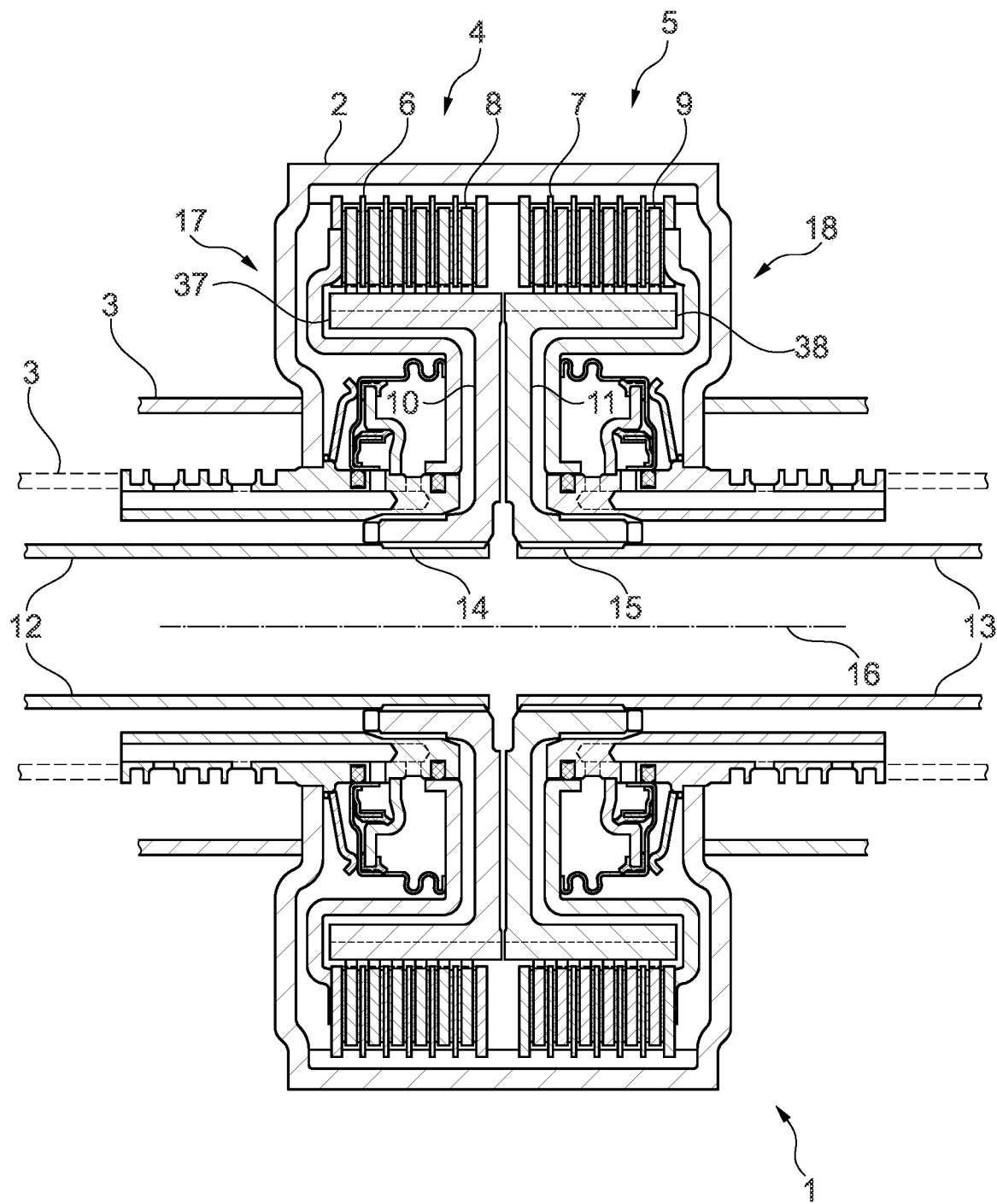
FIG. 1 shows a longitudinal section through an exemplary embodiment of the torque distribution device according to the disclosure.
Figure 2:
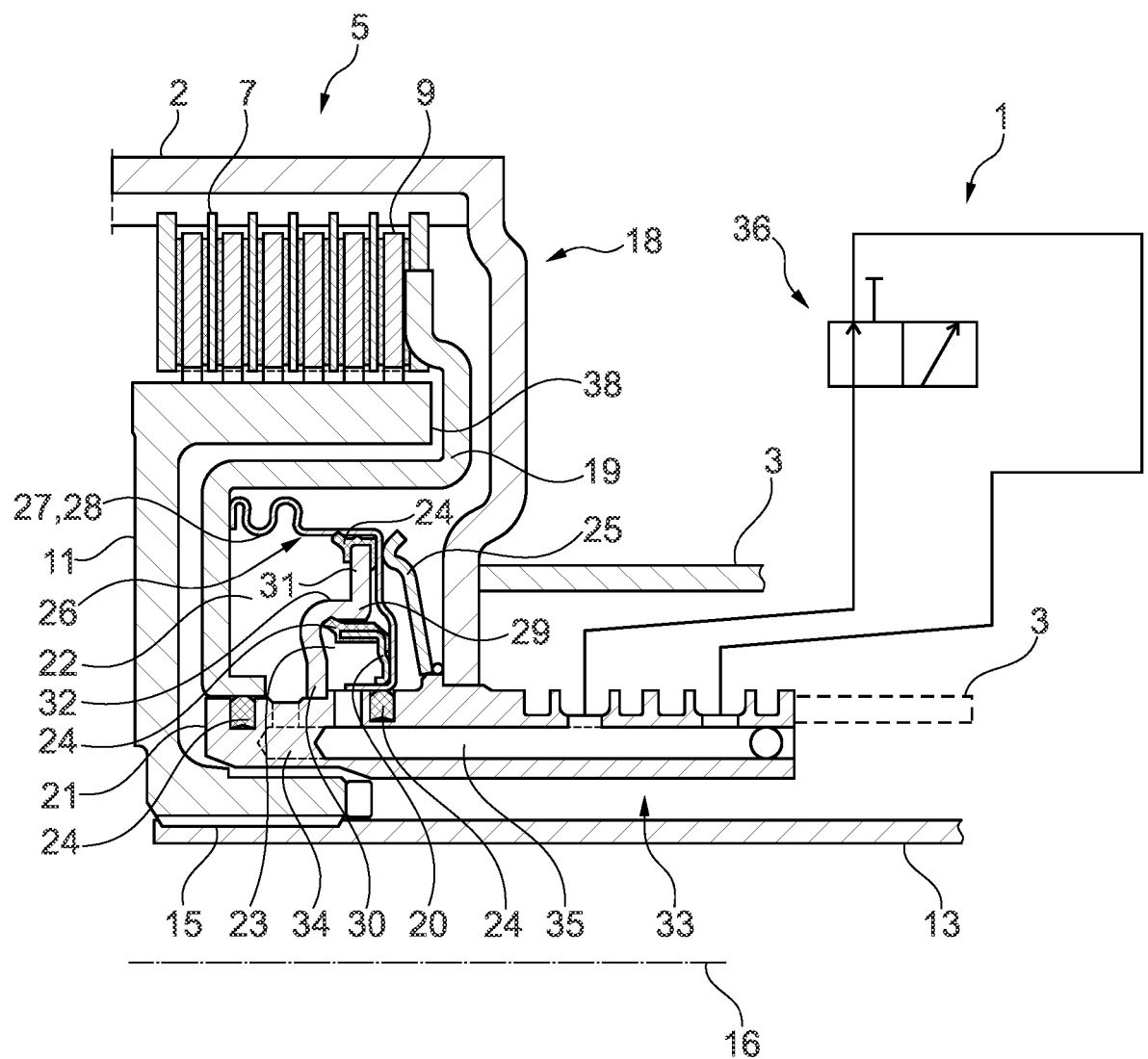
FIG. 2 shows an enlarged view of the right, upper part of the torque distribution device from FIG. 1, and FIGS. 3-5 show several states of the torque distribution device from FIGS. 1 and 2 to explain the method according to the disclosure.

FIG. 1 shows a longitudinal section running along an axial direction through an exemplary embodiment of a torque distribution device 1 according to the disclosure in a schematic representation. FIG. 2 is an enlarged partial view of the upper right quarter of the display area of FIG. 1. The torque distribution device 1 is part of a motor vehicle (not shown) and transmits the drive torque generated by a motor to the two wheels of a common axle in accordance with an adjustable ratio.

The torque distribution device 1 includes a U-shaped rotor support 2, viewed in longitudinal section, which, like almost all components of the torque distribution device 1, is annular. The rotor support 2 is or can be connected to a torque-inducing shaft 3 or input shaft, for example by means of a welded connection. The shaft 3 can also be provided at other locations on the torque distribution device 1, which is indicated by dashed lines in FIGS. 1 and 2. In any case, the shaft 3 is coupled to the rotor support 2, so that the introduced torque is transmitted to the rotor support 2. The rotor support 2 and the shaft 3 are rotatably mounted about an axis of rotation 16.

The torque distribution device 1 also includes two separate clutch devices 4, 5, which are designed as multi-disc clutches. Each of the clutch devices 4, 5 includes an axially displaceable external disc pack 6, 7, which is connected in a rotationally fixed manner to the rotor support 2 via a toothed connection. Each of the clutch devices 4, 5 includes an axially displaceable internal disc pack 8, 9, each of which is coupled in a rotationally fixed manner to an internal disc carrier 37, 38 via a toothed connection and can be or is coupled to a separate output shaft 12, 13 via a hub flange 10, 11. For this purpose, each hub flange 10, 11 has an axial toothing 14, 15 which meshes with an axially extending external toothing of the output shafts 12, 13. The output shafts 12, 13, like the rotor support 2 including the shaft 3, can be rotated about the axis of rotation 16. The outer and internal disc packs 6, 7, 8, 9 interlock and form a common disc pack.

The torque distribution device 1 includes two separate actuation devices 17, 18, via which the respective clutch device 4, 5 can be actuated. The clutch devices 4, 5 and actuation devices 17, 18 can be controlled separately so that the torque introduced by means of the shaft 3 can be selectively guided from the rotor support 2 to the output shafts 12, 13. Details regarding the actuation device 18 are explained below with reference to FIG. 2, in which it is shown enlarged. The aspects explained in this context apply equally to the mirror-image actuation device 17.

The actuation device 18 includes a primary piston 19 and a secondary piston 20. A stationary holding element 21 is provided on the rotor support 2, on which the pistons 19, 20 are axially displaceable and arranged in a fluid-tight manner via sealing elements 24. The primary piston 19 lies with its radially outer end against the external disc pack 7 or faces it, so that the external disc pack 7 can be pressed axially against the internal disc pack 9 by means of the primary piston 19 in order to bring the disc packs 7, 9 into frictional contact or frictional engagement. Seen radially on the inside, the primary piston 19 has a cup-like portion in which further components of the actuation device 18 or torque distribution device 1, which will be discussed in more detail later, are accommodated.

A wall or a portion of the primary piston 19 delimits a primary pressure chamber 22. A pressure medium such as a hydraulic oil can be introduced into the primary pressure chamber 22 and pressurized, so that when the pressure medium is pressurized, the pressure effect of the primary piston 19 just described on the disc packs 7, 9 is brought about. The primary pressure chamber 22 is sealed via the already mentioned sealing elements 24, which can be O-rings made of an elastomer, on which the surfaces involved slide along.

The secondary piston 20 delimits a secondary pressure chamber 23, in which a pressure medium such as hydraulic oil can also be introduced simultaneously and pressurized. Pressurization of the pressure medium in the secondary pressure chamber 23 causes the secondary piston 20 to be moved in the opposite direction to the pressure-related actuating movement of the primary piston 19. This movement takes place against the restoring force of a spring element 25, which is attached to the rotor support 2 and the holding element 21. Based on FIG. 2, pressurization in the secondary pressure chamber 23 causes the secondary piston 20 and the spring element 25 to move to the right. In the present case, the spring element 25 is, for example, a plate spring, but can also be a bellows or comprise multiple helical springs arranged along the circumferential direction of the torque distribution device 1.

The actuation device 18 includes a transmission component 26, which is displaceably arranged on the holding element 21 and which couples the spring element 25 to the primary piston 19 and to the secondary piston 20. The piston-like transmission component 26 includes a further spring element 27, via which the spring element 25 is coupled to the primary piston 19. The further spring element 27 is, for example, a bellows 28 which radially delimits the primary pressure chamber 22. The further spring element 27 and the remaining area of the secondary piston 20 are formed in one piece.

In addition, a support flange 29 of the holding element 21 extending between the primary piston 19 and the secondary piston 20 is provided, which delimits the primary pressure chamber 22 on the one hand and the secondary pressure chamber 23 on the other hand. The support flange 29 has, with respect to the radial direction, a disc-like inner portion 30 and an axially offset, also disc-like, outer portion 31. The portions 30, 31 are connected via a cylindrical, central portion 32 of the support flange 29.

The primary pressure chamber is therefore delimited by the primary piston 19, the bellows 28, the part of the secondary piston 20 immediately adjacent to the bellows 28 and the support flange 29. The secondary pressure chamber 23 is delimited in addition to the secondary piston 20 by the inner section 30 and the middle portion 32 of the support flange 29. The secondary piston 20 is axially displaceable along the middle portion 32, and the secondary pressure chamber 23 is sealed via a corresponding sealing element 24.

The components explained form a structure that is nested several times like cups and is therefore space-saving. The secondary pressure chamber 23 is covered like a cup by the inner portion 30 and the middle portion 32 of the support flange 29. The support flange 29 together with the primary pressure chamber 22 is in turn covered by the transmission component 26 in a cup-like manner. The transmission component 26 in turn is covered by an inner, cup-like portion of the primary piston 19.

To distribute the pressure medium into the pressure chambers 22, 23, a pressure medium distribution unit 33 is provided, which is partially arranged within or in the area of the holding element 21. The pressure medium distribution unit 33 includes a primary pressure medium supply line 34, by means of which the primary pressure chamber 22 can be supplied with pressure medium. Furthermore, the pressure medium distribution unit 33 includes a secondary pressure medium supply line 35, by means of which the secondary pressure chamber 23 can be supplied with pressure medium. The pressure medium distribution unit 33 includes valves (not shown) which can be controlled by means of a control device so that the pressure chambers 22, 23 can be pressurized independently of one another.

An exemplary embodiment of the method according to the disclosure is explained below using the torque distribution device 1 shown in FIGS. 1 and 2. The method relates to the transfer of the multi-disc clutch or clutch device 5 from a release position in which the disc packs are not in frictional engagement to a sensing position in which the disc packs are in frictional engagement. The individual method steps are explained using FIGS. 3 to 5, which each correspond to FIG. 2.

Figure 3:
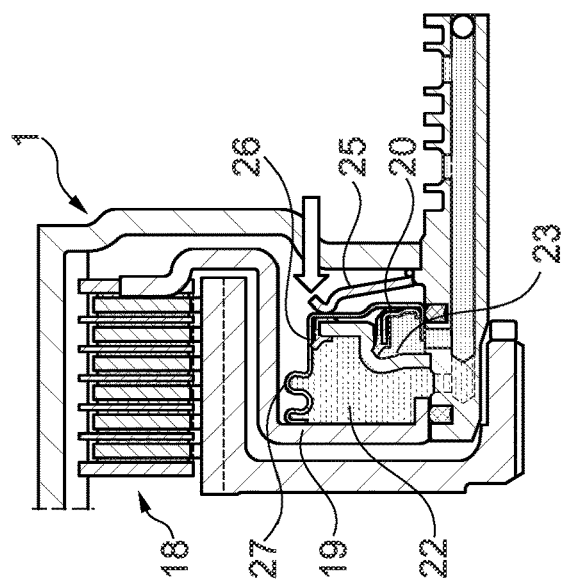

FIG. 3 shows the torque distribution device 1 which is in the release position. The primary piston 19 does not press on the disc packs 7, 9, so that the disc clutch or the clutch device 18 is not in frictional engagement. Here, the primary pressure chamber 22 is not pressurized, which is indicated by the dotted area. In contrast, the secondary pressure chamber 23 is pressurized, which is indicated by the dashed area, so that the secondary piston 20 is pressed into a right-hand stop position in relation to FIG. 3. Via the transmission component 26, the secondary piston 20 presses the elastic element 25 to the right against its restoring force.

Figure 4:
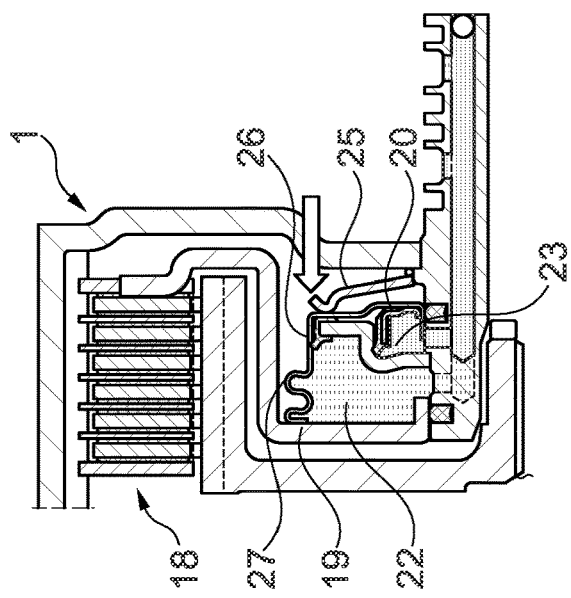

The torque distribution device 1 is shown in FIG. 4, provided that a control signal indicating the transfer of the clutch device 18 into the sensing position is present. This initially results in a reduction or removal of the pressure in the secondary pressure chamber 23, which is indicated by the dotted area. A decrease in pressure in the secondary pressure chamber 23 causes the spring element 25 to relax and thereby pushes the transmission component 26 to the left up to a stop position in which the transmission component 26 abuts the support flange 29, so that the release clearance is quickly overcome. In addition, the primary pressure chamber 22 is pressurized until a desired final pressure is present in the primary chamber 22. FIG. 4 shows the situation immediately after the pressure in the secondary chamber 23 has been removed, wherein the final pressure has not yet built up in the primary chamber 22, which is indicated by the dot-dash area.

A further aspect regarding the state immediately after the pressure in the secondary pressure chamber 23 has been removed, which is shown in FIG. 4, will be explained below with additional reference to FIG. 2. The pressure medium distribution unit 33 thus includes a valve device 36, which can be switched with respect to a passage and a blocking position. Relative to the release position shown in FIG. 2, the valve device 36 is in the open position. If the control signal causing a switching of the torque distribution device 1 is present, the valve device 36 is switched to the open position, such that the primary pressure chamber 22 and the secondary pressure chamber 23 are fluidly connected to one another. This causes the pressure present in the secondary pressure chamber 23 to lead to an increase in pressure in the primary pressure chamber 22, whereby the pressure build-up in the primary pressure chamber 22 can be accelerated.

Figure 5:
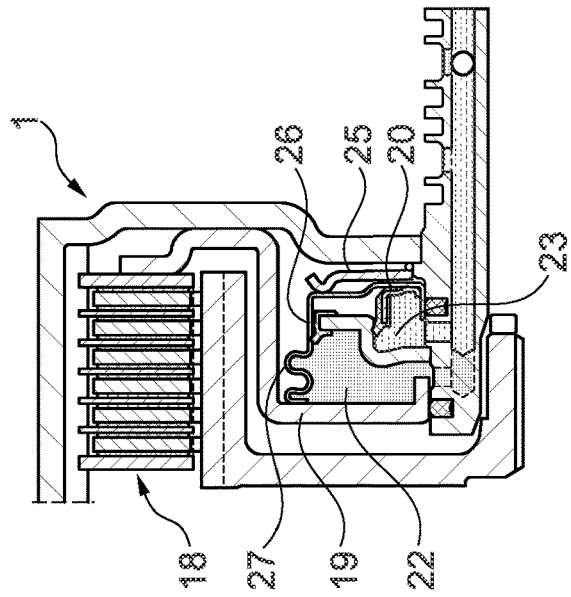

FIG. 5 shows the torque distribution device 1 in the final sensing state, wherein the final pressure is reached in the primary pressure chamber 22. The pressing force of the primary piston 19 against the disc packs 7, 9 results from the pressure force of the primary piston 19 generated by the pressure medium in the primary pressure chamber 22. The pressurization in the primary pressure chamber 22 also causes the further elastic element 27, which delimits the primary pressure chamber 22 to the outside, to be stretched against an elastic restoring force, such that the primary piston 19 is pushed even further to the left.

Aspects relating to the transfer of the multi-disc clutch from the sensing state to the release state are described below. Starting from the situation shown in FIG. 5, a control signal indicating the corresponding transfer causes the primary pressure chamber 22 to be relieved of pressure. The further elastic element 27, which is biased, causes the primary piston 19 to be moved to the right or away from the disc packs 7, 9 immediately upon this pressure relief, such that even when this signal is present, the frictional engagement of the disc clutch is canceled virtually without any time delay. At the same time, pressure is applied in the secondary pressure chamber 23, whereby the secondary piston 20 and at the same time the spring element 25 are moved to the right. In summary, the spring element 25 causes a delay-free switching of the torque distribution device 1 from the release position to the sensing position and the further spring element 27 from the sensing position to the release position.

REFERENCE NUMERALS

1 Torque distribution device
2 Rotor carrier
3 Shaft
4 Clutch device
5 Clutch device
6 External disc pack
7 External disc pack
8 Internal disc pack
9 Internal disc pack
10 Hub flange
11 Hub flange
12 Output shaft
13 Output shaft
14 Axial toothing
15 Axial toothing
16 Rotational axis
17 Actuation device
18 Clutch device
19 Primary piston
20 Secondary piston
21 Holding element
22 Primary pressure chamber
23 Secondary pressure chamber
24 Sealing element
25 Spring element
26 Transmission component
27 Spring element
28 Bellows
29 Support flange
30 Portion
31 Portion
32 Portion
33 Pressure medium distribution unit
34 Primary pressure medium supply line
35 Secondary pressure medium supply line
36 Valve device
37 Internal disc carrier
38 Internal disc carrier

The invention claimed is:

1. A torque distribution device comprising a rotor support, which is or can be coupled to a shaft that introduces the torque, and two separate clutch devices, which are each in the form of a multi-disc clutch and which can each be actuated separately via an actuation device, wherein each of the clutch devices comprises an external disc pack, which is disposed axially displaceably on the rotor support, and an internal disc pack, which is disposed axially displaceably on a separate internal disc carrier and engaging in the external disc pack, which forms a disc pack with the external disc pack, wherein each of the internal disc carriers are each or can each be coupled to a separate output shaft, wherein each of the actuation devices comprises a primary piston, a secondary piston and a holding element that is stationary with respect to the rotor support, on which the primary piston and the secondary piston are axially displaceably mounted, wherein the primary piston delimits a primary pressure chamber and can be moved against the external disc pack when a pressure medium located in the primary pressure chamber is pressurized, so that the external disc pack moves towards the internal disc pack in such a way that a torque can be transmitted from the shaft to the output shaft and vice versa by means of friction between the external disc pack and the internal disc pack caused by compressive force, wherein the secondary piston delimits a secondary pressure chamber, wherein the secondary piston can be moved counter to the restoring force of a spring element when the or a pressure medium located in the secondary chamber is pressurized, in a direction counter to the pressure-induced actuation movement of the primary piston, and wherein the spring element is coupled to the primary piston in such a way that it moves the primary piston against the external disc pack when the pressure in the secondary pressure chamber is reduced.

2. The torque distribution device according to claim 1, wherein the spring element is a plate spring or a bellows or comprises multiple helical springs arranged along a circumferential direction of the torque distribution device.

3. The torque distribution device according to claim 1, wherein a transmission component is provided disposed axially displaceably on the holding element, which transmission component couples the spring element to the primary piston and to the secondary piston.

4. The torque distribution device according to claim 3, wherein the transmission component has a further spring element, via which the spring element is coupled to the primary piston.

5. The torque distribution device according to claim 4, wherein the further spring element is or comprises a bellows which radially delimits the primary pressure chamber.

6. The torque distribution device according to claim 1, wherein the holding element has a support flange which extends between the primary piston and the secondary piston and which delimits the primary pressure chamber or the secondary pressure chamber.

7. The torque distribution device according to claim 6, wherein the support flange has, with respect to the radial direction, an inner portion and an axially offset outer portion, wherein the inner portion and the outer portion are connected to one another via a middle portion of the support flange, wherein the secondary pressure chamber is delimited by the inner portion and the middle portion.

8. A method for operating a torque distribution device according to claim 1, wherein the multi-disc clutch is transferred from a release position, in which the disc packs are not in frictional contact, to a sensing position, in which the disc packs are in frictional contact, wherein the pressure medium arranged in the primary pressure chamber is depressurized before the pressure medium arranged and pressurized in the secondary pressure chamber is pressurized or the multi-disc clutch is transferred from the sensing position to the release position by depressurizing the pressure medium arranged and pressurized in the primary pressure chamber and pressurizing the pressure medium arranged in the secondary pressure chamber.

9. The method according to claim 8, wherein the pressure relief of the pressure medium arranged in the secondary pressure chamber and pressurized when the multi-disc clutch is transferred from the release position to the sensing position takes place when a valve device is switched in such a way that the primary pressure chamber and the secondary pressure chamber are fluidically connected to one another.

10. A torque distribution device comprising:
a rotor support couplable to an input shaft;
an internal disc carrier couplable to an output shaft;
a clutch device formed as a multi-disc clutch, the clutch device comprising a disc pack arranged for frictionally transmitting torque from the input shaft to the output shaft, the disc pack comprising:
- an external disc pack disposed axially displaceably on the rotor support; and
- an internal disc pack disposed axially displaceably on the internal disc carrier and engageable with the external disc pack;

an actuation device for actuating the clutch device, the actuation device comprising:
- a holding element arranged stationary with respect to the rotor support;
- a spring element;
- a primary piston axially displaceably mounted on the holding element, the primary piston delimiting a primary pressure chamber and arranged to be moved in a first axial direction against the external disc pack when a pressure medium disposed in the primary pressure chamber is pressurized; and
- a secondary piston axially displaceably mounted on the holding element, the secondary piston delimiting a secondary pressure chamber and movable counter to a restoring force of the spring element in a direction opposite the first axial direction when a pressure medium disposed in the secondary pressure chamber is pressurized, wherein the spring element is coupled to the primary piston to move the primary piston in the direction opposite the first axial direction when the pressure medium disposed in the secondary pressure chamber is depressurized.

11. The torque distribution device of claim 10, wherein the spring element:
- is a plate spring;
- is a bellows; or
- comprises multiple helical springs arranged along a circumferential direction of the torque distribution device.

12. The torque distribution device of claim 10, wherein the actuation device further comprises a transmission component disposed axially displaceably on the holding element and arranged to couple the spring element to the primary piston and the secondary piston.

13. The torque distribution device of claim 12, wherein the transmission component comprises a further spring element coupling the spring element to the primary piston.

14. The torque distribution device of claim 13 wherein the further spring element is or comprises a bellows which radially delimits the primary pressure chamber.

15. The torque distribution device of claim 10, wherein:
- the holding element comprises a support flange extending between the primary piston and the secondary piston, and
- the support flange delimits the primary pressure chamber of and/or the secondary pressure chamber.

16. The torque distribution device of claim 15, wherein the support flange comprises:
- an inner disc-like portion; and
- an outer disc-like portion, axially offset from the inner disc-like portion; and
- a cylindrical middle portion connecting the inner disc-like portion to the outer disc-like portion, wherein the secondary pressure chamber is delimited by the inner disc-like portion and the cylindrical middle portion.

* * * * *